(12) United States Patent
Park

(10) Patent No.: US 11,978,363 B2
(45) Date of Patent: May 7, 2024

(54) CASE HAVING CAR SAFETY WARNING SIGN INTEGRATED THEREIN

(71) Applicant: Hongjae Park, Seoul (KR)

(72) Inventor: Hongjae Park, Seoul (KR)

( * ) Notice: Subject to any disclaimer, the term of this patent is extended or adjusted under 35 U.S.C. 154(b) by 121 days.

(21) Appl. No.: 17/791,912

(22) PCT Filed: Feb. 15, 2021

(86) PCT No.: PCT/KR2021/001858
§ 371 (c)(1),
(2) Date: Jul. 11, 2022

(87) PCT Pub. No.: WO2021/172798
PCT Pub. Date: Sep. 2, 2021

(65) Prior Publication Data
US 2022/0406231 A1     Dec. 22, 2022

(30) Foreign Application Priority Data

Feb. 26, 2020  (KR) .......................... 10-2020-0023768

(51) Int. Cl.
*G09F 21/04* (2006.01)
*B60Q 7/00* (2006.01)
(Continued)

(52) U.S. Cl.
CPC .............. *G09F 21/041* (2020.05); *G09F 7/18* (2013.01); *G09F 13/16* (2013.01); *B60Q 7/005* (2013.01);
(Continued)

(58) Field of Classification Search
CPC ..... G09F 2007/1873; G09F 2007/1865; G09F 2007/1852; G09F 13/16; G09F 7/18; G09F 21/041; B60Q 7/005
See application file for complete search history.

(56) References Cited

U.S. PATENT DOCUMENTS

| 2,671,423 A | * | 3/1954 | Mead ........................ B60Q 3/30 |
| | | | 116/28 R |
| 3,430,374 A | * | 3/1969 | Woodard ............... B60Q 7/005 |
| | | | 40/591 |

(Continued)

FOREIGN PATENT DOCUMENTS

| KR | 20-1998-037585 U | 9/1998 |
| KR | 20-0152242 Y1 | 7/1999 |

(Continued)

OTHER PUBLICATIONS

International Search Report for PCT/KR2021/001858 dated Jun. 8, 2021 from Korean Intellectual Property Office.

*Primary Examiner* — David R Dunn
*Assistant Examiner* — Christopher E Veraa
(74) *Attorney, Agent, or Firm* — Revolution IP, PLLC

(57) ABSTRACT

A safety warning sign, when not in use, is rolled and stored inside to case, and in the event of emergency, when a driver opens the trunk and then opens the case by pulling a cover with a finger while the case is attached and affixed to the edge of the trunk by means of a magnetic body of an attachment member connected to the case, the safety warning sign stored in the form of a roll inside the case is, simultaneously as the case is opened, automatically spread open by its own weight (gravity) and deployed, thus allowing the driver, even in the state of panic from an accident, to easily and rapidly install the car safety warning sign and quickly escape to safety.

6 Claims, 16 Drawing Sheets

(51) Int. Cl.
*G09F 7/18* (2006.01)
*G09F 13/16* (2006.01)

(52) U.S. Cl.
CPC ............... *G09F 2007/1852* (2013.01); *G09F 2007/1865* (2013.01); *G09F 2007/1873* (2013.01)

(56) References Cited

U.S. PATENT DOCUMENTS

| | | | | |
|---|---|---|---|---|
| 3,590,506 | A * | 7/1971 | Jeski | B60Q 7/005 |
| | | | | 116/28 R |
| 3,594,938 | A * | 7/1971 | Mosch | G09F 21/04 |
| | | | | 40/591 |
| 3,949,503 | A * | 4/1976 | Waress | G09F 21/04 |
| | | | | 40/591 |
| 4,108,311 | A * | 8/1978 | McClendon | B60Q 7/005 |
| | | | | 40/607.1 |
| 5,438,780 | A * | 8/1995 | Winner | E01F 9/646 |
| | | | | 160/DIG. 7 |
| 6,785,990 | B2 * | 9/2004 | Tomlin | G09F 21/048 |
| | | | | 40/591 |
| 7,404,372 | B2 * | 7/2008 | Aasgaard | B60Q 1/52 |
| | | | | 340/471 |
| 8,667,718 | B2 * | 3/2014 | Lang | G09F 11/18 |
| | | | | 40/515 |
| 2004/0163295 | A1 * | 8/2004 | Fontana | A47F 7/163 |
| | | | | 40/611.02 |
| 2005/0081413 | A1 * | 4/2005 | Ko | G09F 15/0025 |
| | | | | 40/591 |
| 2011/0179684 | A1 * | 7/2011 | Blaho | G09F 21/048 |
| | | | | 40/591 |
| 2013/0160336 | A1 * | 6/2013 | Harman, Jr. | G09F 13/00 |
| | | | | 40/591 |
| 2018/0134214 | A1 * | 5/2018 | Yoon | B60N 3/04 |
| 2022/0406231 | A1 * | 12/2022 | Park | G09F 13/16 |

FOREIGN PATENT DOCUMENTS

| | | |
|---|---|---|
| KR | 20-2017-0000497 U | 2/2017 |
| KR | 10-1775496 B1 | 9/2017 |
| KR | 10-1838885 B1 | 3/2018 |
| KR | 10-1985536 B1 | 6/2019 |
| KR | 10-2019-0121039 A | 10/2019 |

* cited by examiner

【Figure 1】
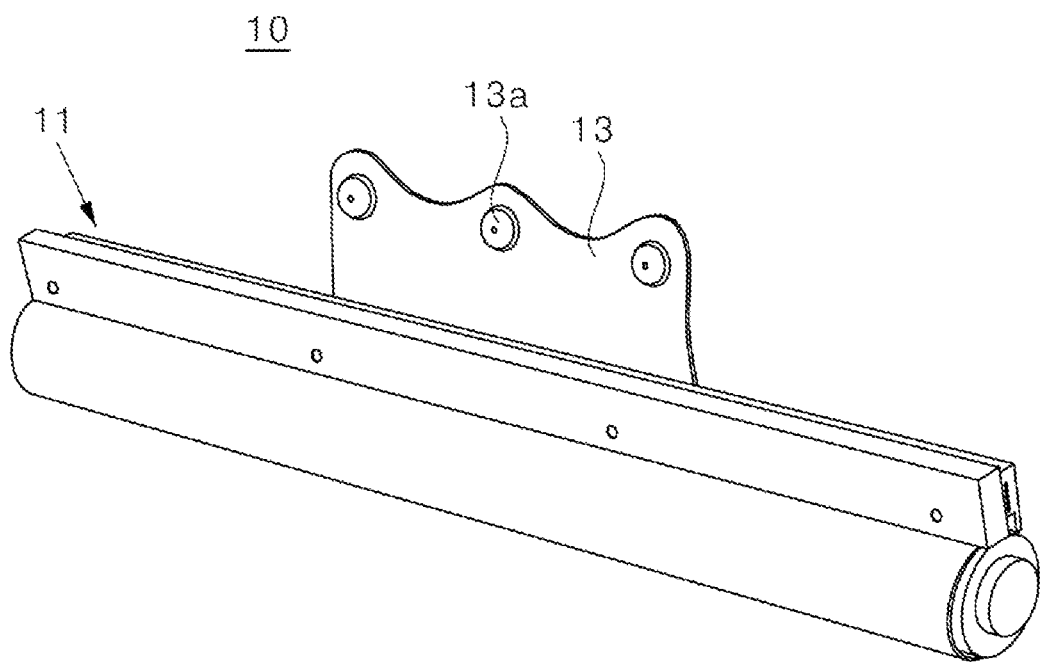

[Figure 2]
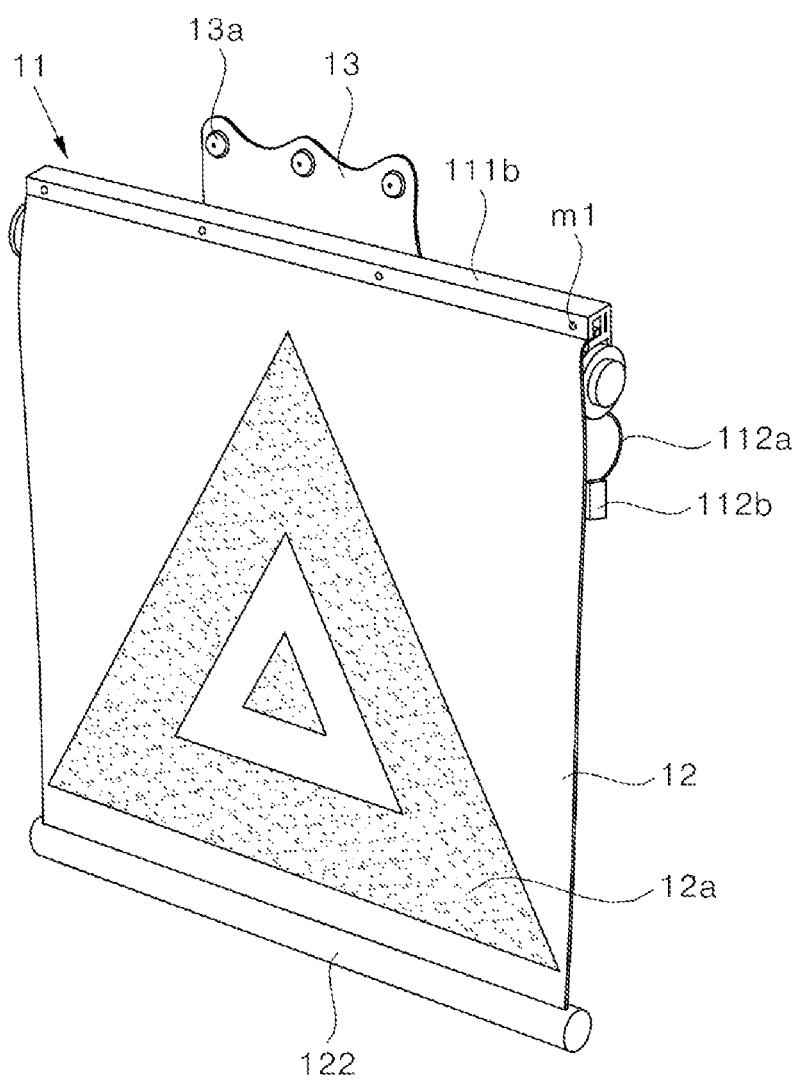

【Figure 3】
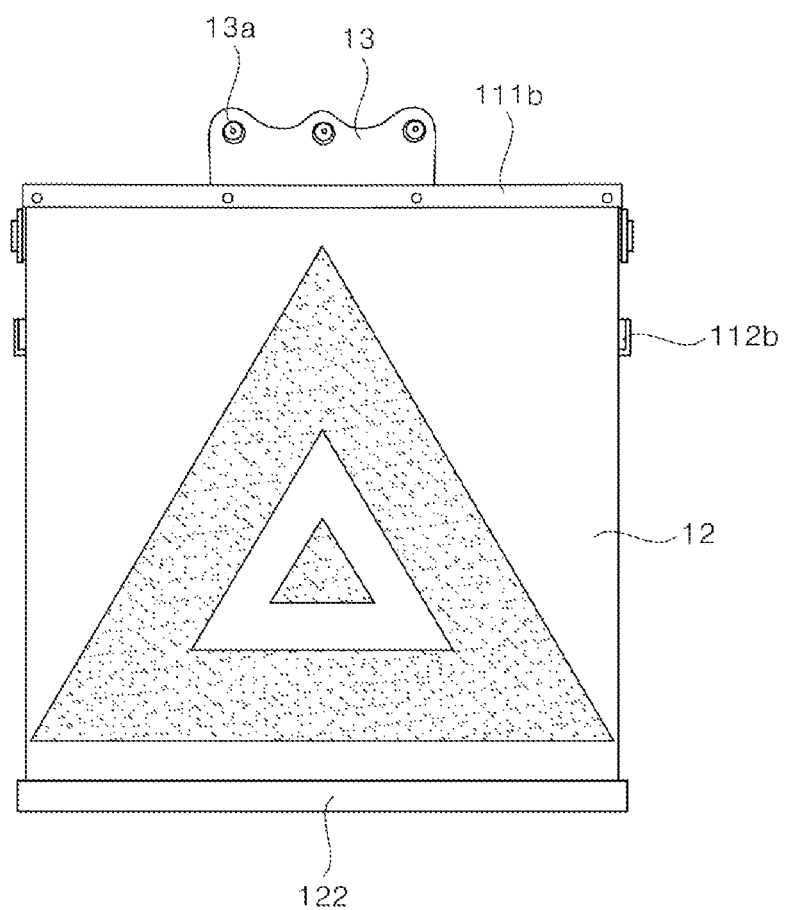

[Figure 4]
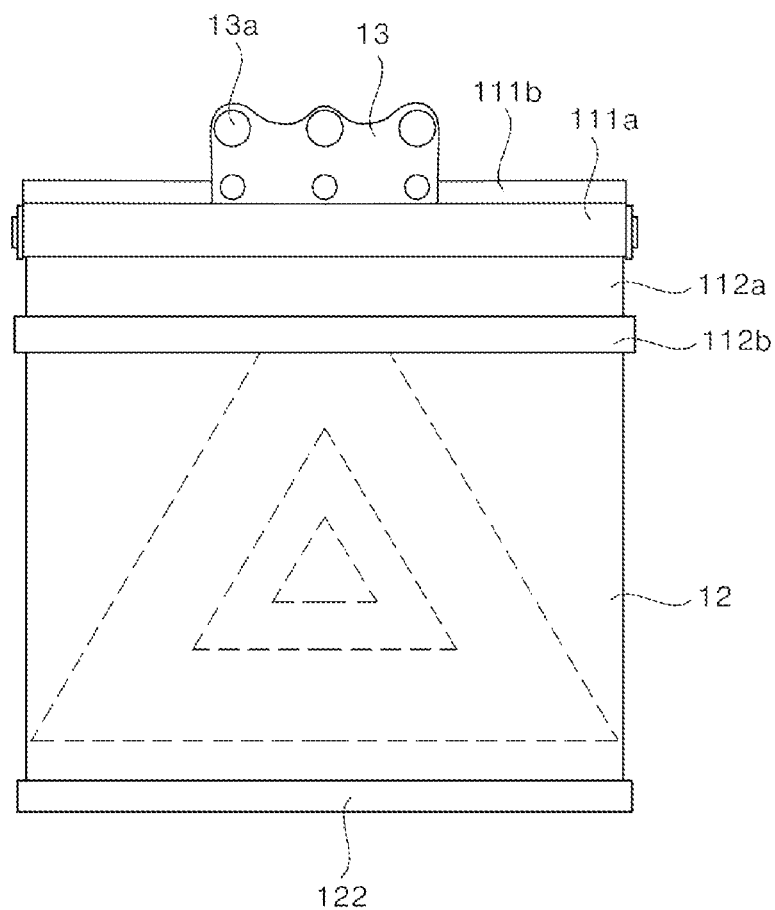

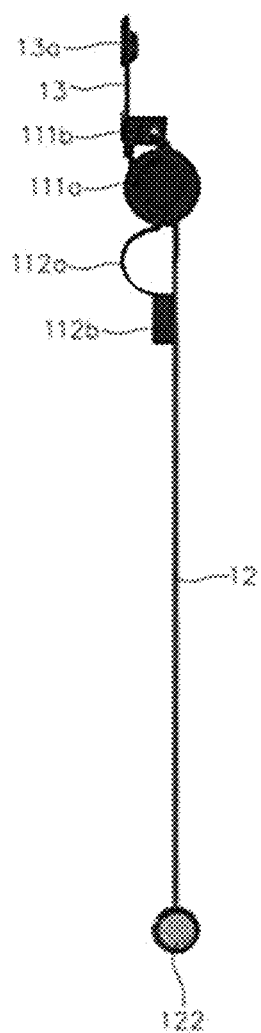
[Figure 5]

[Figure 6]
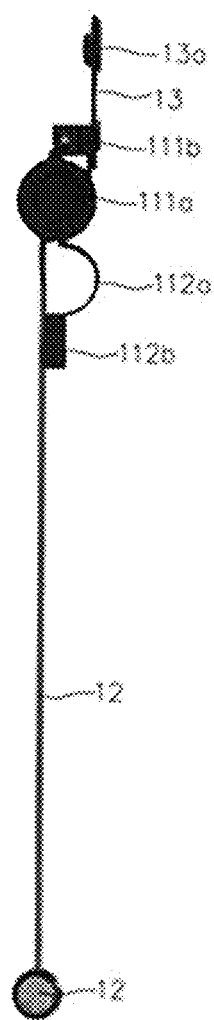

[Figure 7]
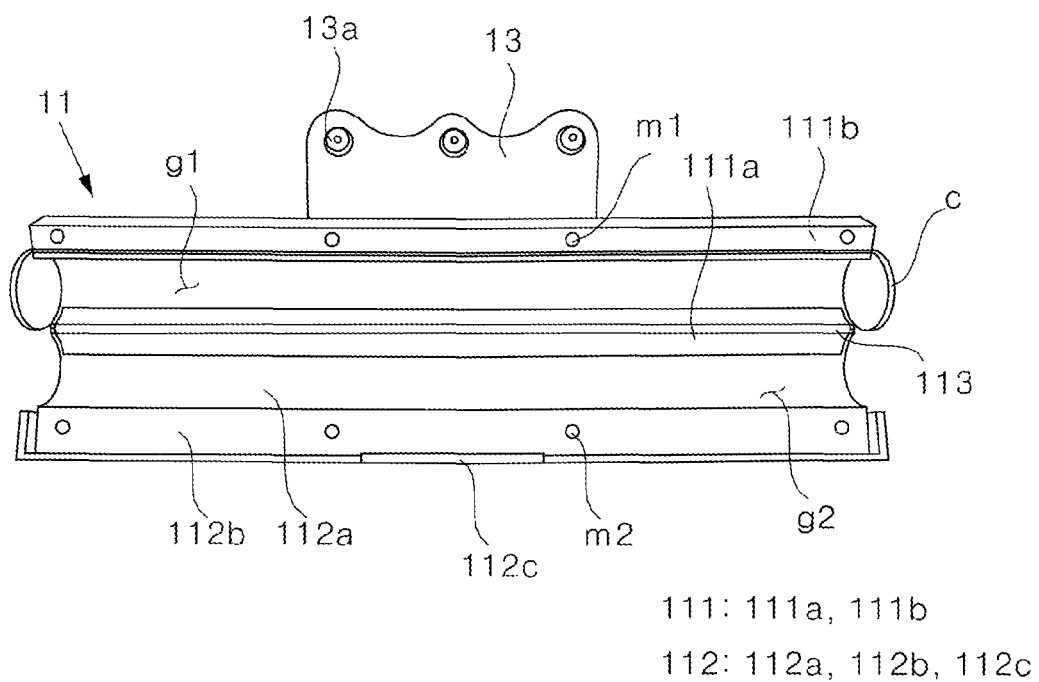
111: 111a, 111b
112: 112a, 112b, 112c

[Figure 8]
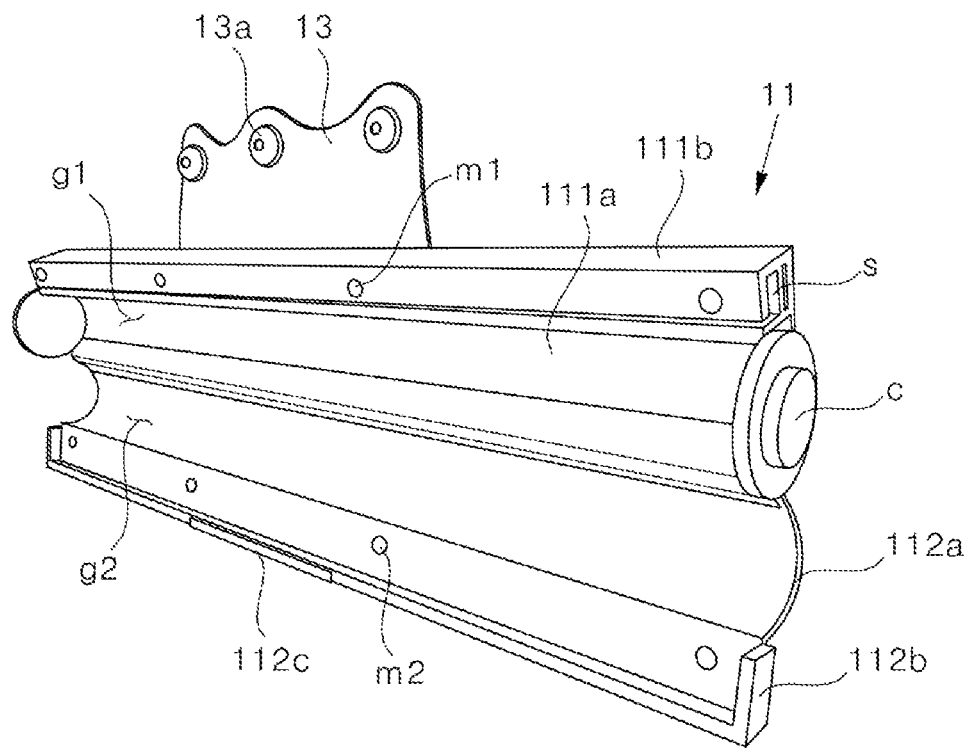

[Figure 9]
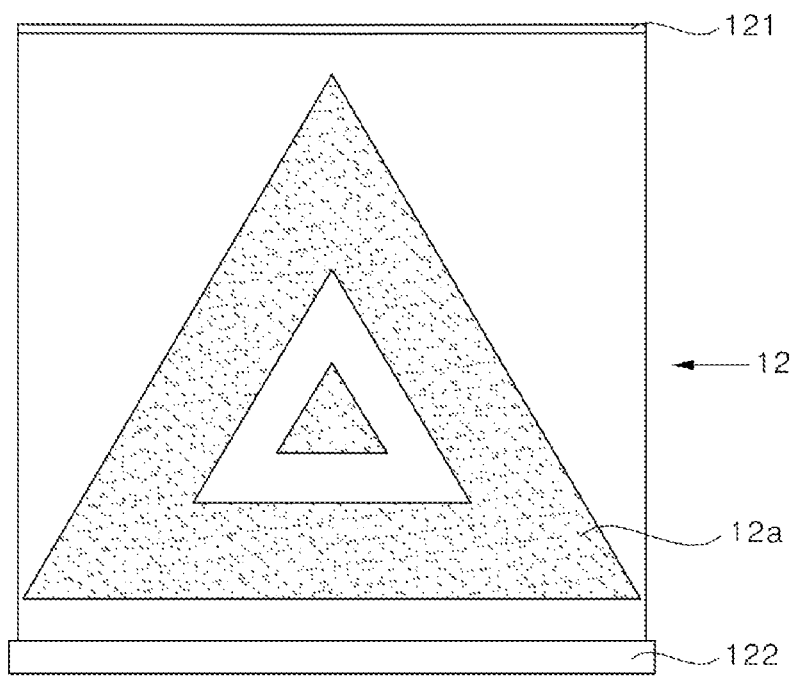

[Figure 10]
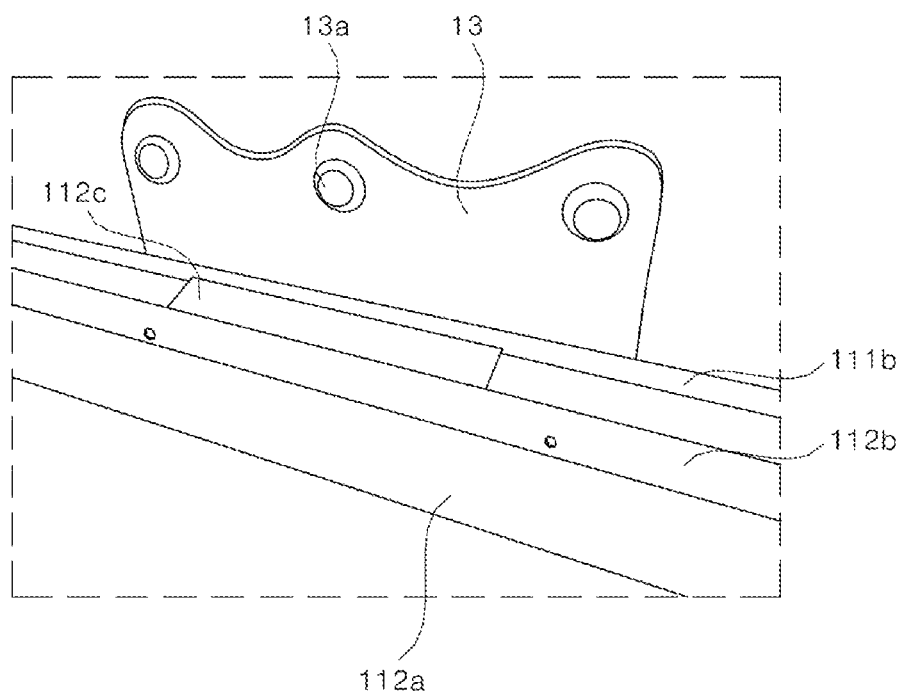

[Figure 11]
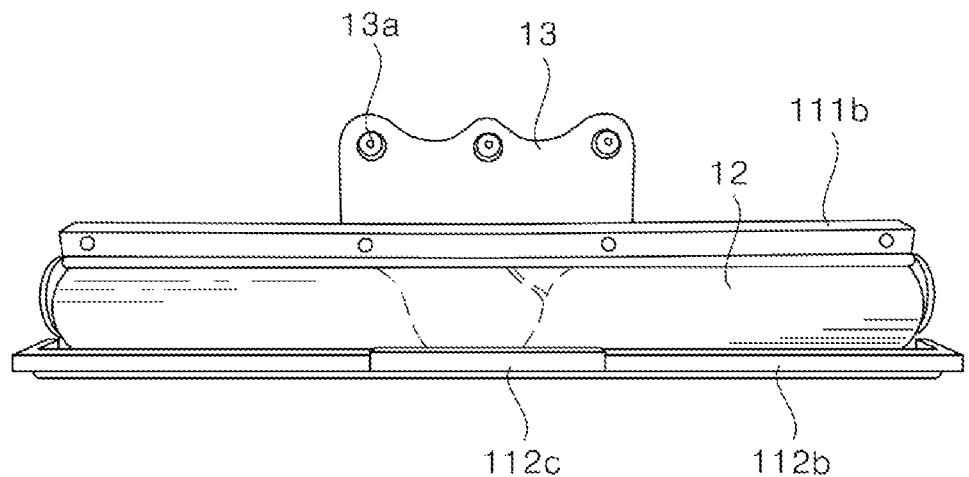
[Figure 12]
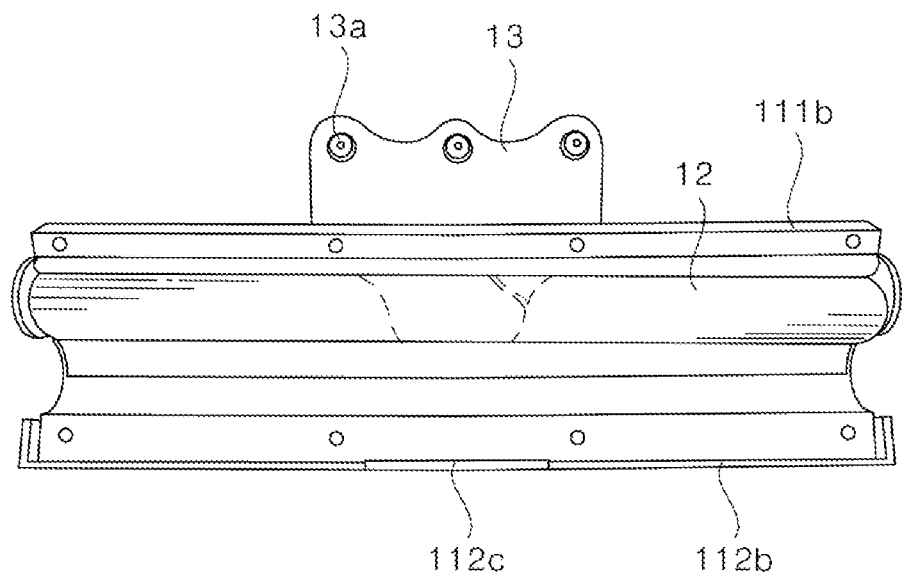

【Figure 13】
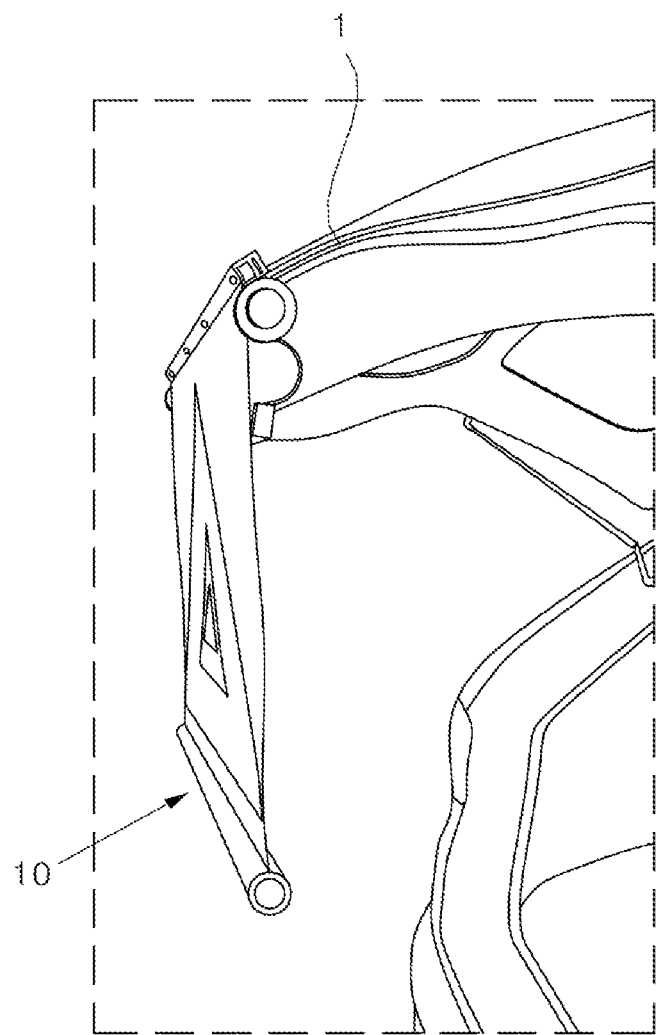

【Figure 14】
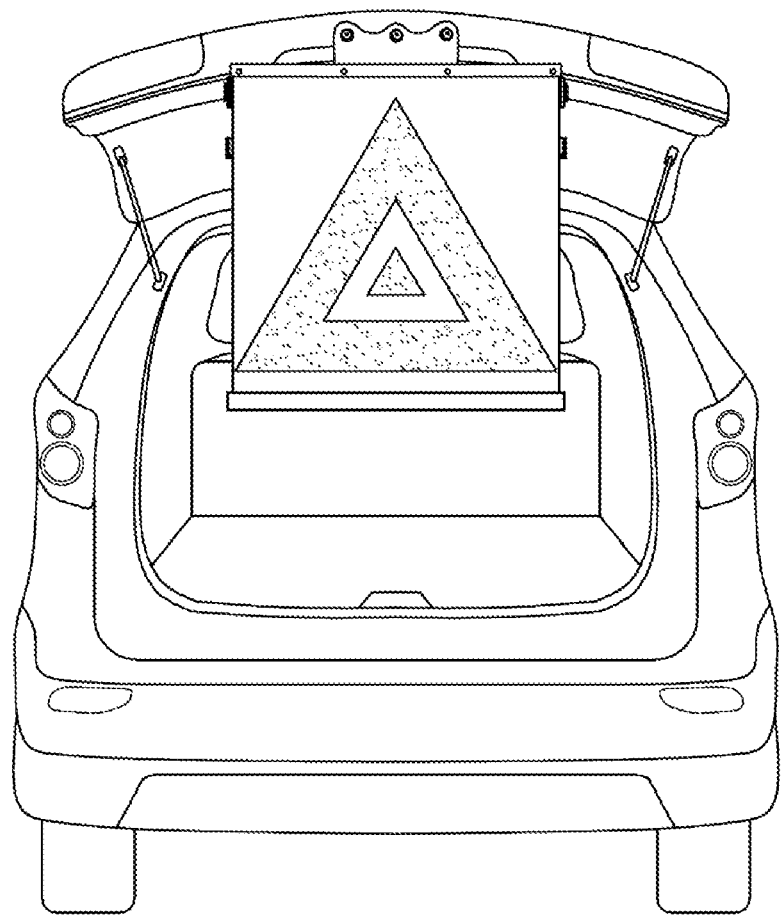

【Figure 15】
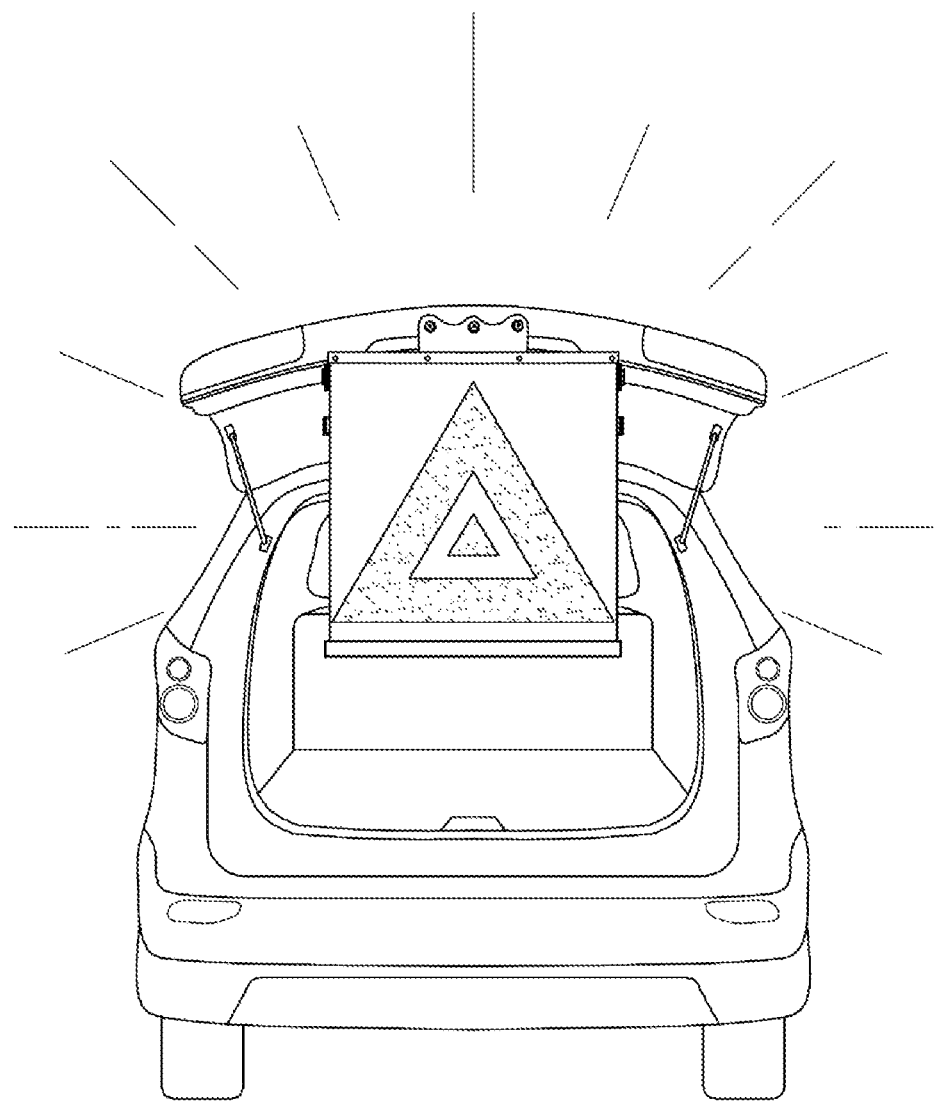

【Figure 16】
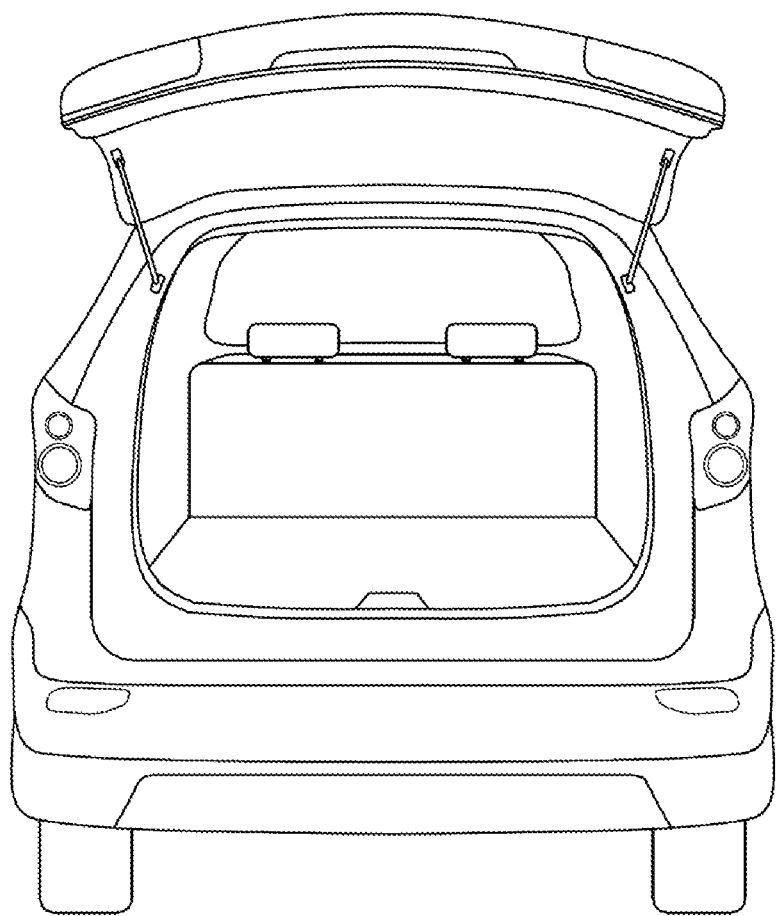

【Figure 17】
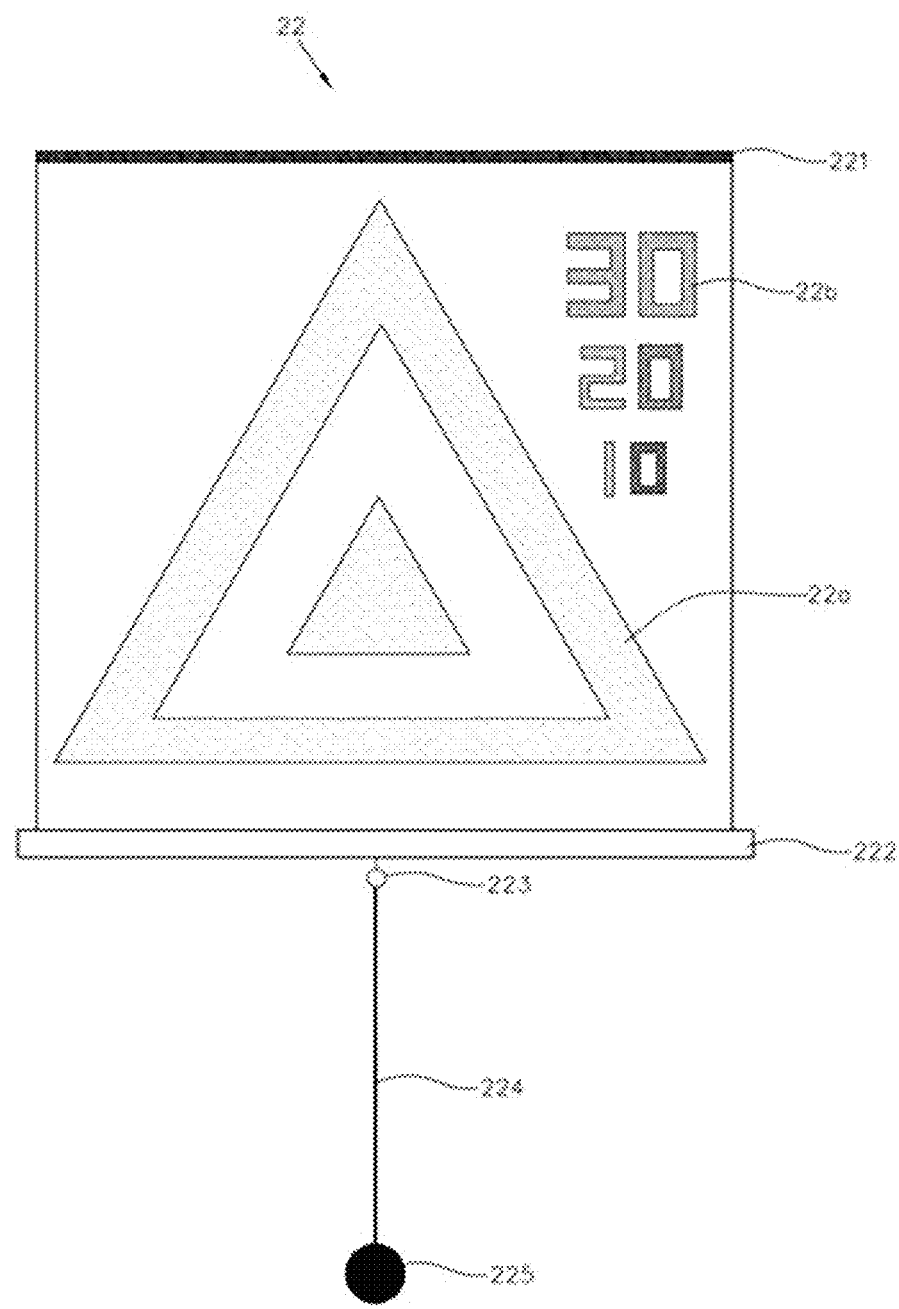

CASE HAVING CAR SAFETY WARNING SIGN INTEGRATED THEREIN

TECHNICAL FIELD

The present disclosure relates to a case having a car safety warning sign integrally stored therein, and more specifically, to a case having a car safety warning sign integrally stored therein, in which the safety warning sign, when not in use, is rolled and stored, and in the event of emergency, when a driver opens the trunk and then opens the case by pulling a cover with a finger while the case is attached and affixed to the edge of the trunk by means of a magnetic body of an attachment member connected to the case, the safety warning sign stored in the form of a roll inside the case is, simultaneously as the case is opened, automatically deployed and installed by its own weight (gravity), thereby allowing the driver, even in the state of panic from an accident, to easily and rapidly install the car safety warning sign and thus induce a quick escape to a safety zone.

BACKGROUND ART

In general, a car safety warning sign is configured to be installed on a road behind a vehicle when the vehicle is stopped in an emergency on the road or shoulder due to malfunction of the vehicle during driving or a car accident such that the drivers of following vehicles recognize an emergency situation in the front area in order to prevent secondary collision accidents of the following vehicles, and a warning triangle has been representatively known.

A warning triangle is stowed in the trunk in normal times and, if necessary, a user takes the warning triangle out and independently sets up and uses the warning triangle behind the vehicle on the road. Since the warning triangle is manufactured in relatively small sizes for the convenience of carrying, when the warning triangle is installed directly on a road on which vehicles are driven at high speeds, it is positioned lower than the heights of the driver's eyes of following vehicles, so it does not come into the visual field of the drivers of following vehicles, thereby having limitation in prevent of secondary collision accidents.

In order to solve the problems of existing warning triangles, techniques of installing a warning triangle in a trunk have been proposed in many prior art documents including Korean Utility Model No. 20-0152242, Korean Laid-open Utility Model Publication Nos. 20-1998-037585 and 20-2017-0000497, Korean Patent No. 10-1838885, etc.

The car safety warning signs proposed in the prior art documents have a warning triangle integrated with a trunk to be deployed and exposed when the trunk is opened. That is, a warning triangle is integrally installed in a trunk, so when the trunk is opened, the warning triangle is also deployed or exposed with opening of the trunk, thereby providing convenience in used for drivers.

However, since the car safety warning signs proposed in the prior art documents are stowed with the warning triangle installed in a trunk, they are difficult to carry and require a large space for stowing, so there is a problem that spatial usefulness of a trunk is decreased. In particular, when loads are put into a trunk or loads in a trunk are taken out, the loads are stuck to the safety warning sings, which causes inconvenience when using a trunk.

In order to solve this problem, in Korean Patent No. 10-1985536, the applicant proposed a car safety warning sign that is easy to be stowed, can be simply and quickly mounted at various positions in a vehicle, and thus enables a driver to more safely and quickly cope with an emergency situation because a safety warning sign is rolled in a roll type using a coupling member when it is not used and is mounted and deployed inside or outside a vehicle or at the upper portion in the trunk of a vehicle using magnetism when it is used.

However, the car safety warning sign according to the related art proposed in Korean Patent No. 10-1985536 has an advantage of easy installation in comparison to existing warning signs, but it should be stowed in a separately prepared cylindrical case when it is not used, so a user has to take the warning sign out of the case and then install it in an emergency, whereby it takes a relatively long time to install the warning sign. Accordingly, there is a problem that a time for which a driver can quickly escape to a safety zone in an urgent situation is not secure, which may result in a larger secondary accident.

Not only many vehicles are usually driven, but vehicles are driven at relatively high speeds on highways. In particular, when a sudden emergency situation such as malfunction of a vehicle or a car accident occurs while driving on a highway at dark night, even skillful drivers embarrass and get into a panic, so their body response speed unavoidably decreases in comparison to the normal state, and accordingly, drivers have to be able to more simply and easily set up a warning sign.

Nevertheless, since the car safety warning sign according to the related art is stowed in a separate case, it takes an additional time to take the warning sign out of the case in an emergency situation. In particular, if a user embarrasses and gets all flustered when taking the warning sign out of the case, the driver may not set up the warning sign well such as a drop it to the ground and more setup time is required, so there is a problem that a sufficient escape time cannot be secured.

PRIOR ART DOCUMENT

Patent Document (Patent Document 1) KR 20-0152242 Y1, 1999. Apr. 23.
(Patent Document 2) KR 20-1998-037585 U, 1998. Sep. 15.
(Patent Document 3) KR 20-2017-0000497 U, 2017. Feb. 7.
(Patent Document 4) KR 10-1838885 B1, 2018. Mar. 9.

DISCLOSURE

Technical Problem

Accordingly, the present disclosure has been proposed in an effort to solve the problems in the related art and can provide the following objectives.

First, an objective of the present disclosure is to provide a case having a safety warning sign, which is integrally stored therein and can be immediately attached and set up in a vehicle without unnecessary preparation actions such as taking out from the case or assembling, thereby enabling a driver embarrassed due to an accident to easily and quickly set up the safety warning sign and secure a sufficient escape time.

Second, another objective of the present disclosure is to provide a case that can be simply attached and installed at the end of the trunk of a vehicle through a magnetic body (magnetic member) so that a safety warning signal is installed at a high position from the ground and drivers of following vehicles can easily recognize the safety warning sign, thereby being able to prevent a secondary accident.

Technical Solution

In order to achieve the objectives, an aspect of the present disclosure provides a case having a car safety warning sign integrally stored therein, the case including: a body including a housing having a fitting groove longitudinally formed and a cover opening and closing the housing; a safety warning sign having an upper end fitted in a fitting groove formed at the housing to be integrally coupled, rolled in a roll type and accommodated in the housing when not used, and being moved down, unrolled, and deployed by its own weight simultaneously as the housing is opened in an emergency situation; a mounting member connected to the body, having a magnetic body embedded therein, and attaching and fixing the body to a trunk of a vehicle; and a rotary member rotatably coupling the cover to a lower end of the housing, wherein the housing includes a first accommodation groove section at which a semicircular first accommodation groove in which the rolled safety warning sign is accommodated, and a first panel section to which the mounting member is connected, that is integrally formed over the first accommodation groove section, and that has a first magnetic body embedded in a front surface thereof, and the cover includes a second accommodation groove section at which a semicircular second accommodation groove is formed symmetrically to the first accommodation groove of the body, and a second panel section in which a second magnetic body is embedded to be attached to the first magnetic body embedded in the first panel section of the body by magnetism.

Further, when the first and second panel sections are attached to each other through the first and second magnetic bodies, a circular accommodation space, in which the safety warning sign rolled in a roll type is accommodated, may be formed by the first and second accommodation grooves.

Further, the case may further include a non-slip section installed at the center of the second panel section and preventing slip of fingers when a user pulls the second panel section using fingers to open the housing.

Further, the safety warning sign may have a safety warning mark at the center thereof to be recognizable, a rail member disposed at the upper end thereof to be fitted in a fitting groove of the body, and a winding rod, which is formed in a cylindrical rod shape such that the safety warning sign rolled in a roll type and accommodated in the first accommodation groove of the housing is unrolled and deployed by its own weight when the cover is opened, at the lower end thereof.

Further, the safety warning sign may further have a distance mark shown with '30', '20', and '10' so that drivers of following vehicles can recognize distances from the vehicles, wherein the '30' may be formed in a size that can be recognized by people at 30 m, the '20' may be formed in a size that can be recognized by people at 20 m, and the '10' may be formed in a size that can be recognized by people at 10 m, and the distance mark may be formed by any one of luminous printing, reflective cloth, or a reflective tape.

Further, the safety warning sign may further include a connecting ring connected to the center of the winding rod to fix the winding rod such that the safety warning sign does not flutter in the wind in an unrolled state, an elastic string connected to the connecting ring, and a magnetic body connected to an end of the elastic string and attached and fixed to a car body of a vehicle by magnetism.

Advantageous Effects

As described above, according to the present disclosure, the following effects can be achieved.

First, according to the present disclosure, since the safety warning sign is integrated with the case, the safety warning sign is easily stored and carried when it is not used, and an embarrassed driver can easily and quickly install the safety warning sign by immediately mounting the safety warning sign in a vehicle without an unnecessary preparation actions such as taking the safety warning sign out of the case or assembling the safety warning sign in an emergency, whereby it is possible to secure a sufficient escape time.

Second, according to the present disclosure, the case can be quickly and simply mounted at the end of the trunk of a vehicle through magnetism using the mounting member in an accident, so the safety warning sign is positioned at a relatively high position from the ground, whereby drivers of following vehicles can easily recognize the safety warning sign. Accordingly, it is possible to improve the possibility of recognition by drivers of following vehicles and considerably improve a secondary accident prevention ratio.

Third, according to the present disclosure, the case is mounted in the trunk of a vehicle through the mounting member, the body is opened in a one touch type by separating the cover of the case from the body, and simultaneously, the safety warning sign accommodated therein is automatically deployed, so it is possible to quickly install the case and to secure a sufficient time so that a driver can escape from the site of a car accident.

Fourth, according to the present disclosure, since the safety warning sign has a distance mark enabling distances from following vehicles to be recognized, drivers of following vehicles recognize a dangerous situation through the safety warning mark, recognize the distances from themselves to the current place with the dangerous situation through the distance mark, and appropriately cope with the situation, depending on the distances, whereby it is possible to remarkably reduce a secondary accident ratio.

Fifth, according to the present disclosure, since the lower end of the safety warning sign is attached and fixed to a car body using an elastic string and a magnetic body, it is possible to minimize or prevent fluttering of the safety warning sign in the wind.

BRIEF DESCRIPTION OF THE DRAWINGS

FIG. 1 is a perspective view showing a case having a car safety warning sign integrated therein
according to an embodiment of the present disclosure.
FIG. 2 is a perspective view sowing a deployed state of the safety warning sign.
FIG. 3 is a front view of FIG. 2.
FIG. 4 is a rear view of FIG. 2.
FIG. 5 is a left side view of FIG. 2.
FIG. 6 is a right side view of FIG. 2.
FIG. 7 is a view showing from the front the state in which a cover of the case is open with the safety warning sign
according to the present disclosure separated from the case.
FIG. 8 is a view showing the case shown in FIG. 7 from a side.

FIG. 9 is a front view showing the state in which the safety warning sign according to the present disclosure is deployed.

FIGS. 10 to 12 are views showing a deployment process of the safety warning sign
according to the present disclosure.

FIG. 13 is a view showing from a side the state in which the case having a car safety warning sign integrated therein
according to an embodiment of the present disclosure is installed at a trunk.

FIGS. 14 and 15 are views showing the state in which the case having a car safety warning sign integrated therein
according to an embodiment of the present disclosure is installed.

FIG. 16 is a comparative view showing the state in which the case having a car safety warning sign integrated therein
according to an embodiment of the present disclosure is not installed at night.

FIG. 17 is a front view for describing a safety warning sign
according to another example of the present disclosure.

BEST MODE

The advantages and features of the present disclosure, and methods of achieving them will be clear by referring to the exemplary embodiments that will be describe hereafter in detail with reference to the accompanying drawings. However, the present disclosure is not limited to the disclosed embodiments and may be implemented in other various ways. Like reference numerals indicate like components throughout the specification. Further, the thicknesses and widths of layers in the drawings were enlarged and exaggerated for the convenience of description to help understand the present disclosure. Further, a singular form includes a plural form unless specifically stated in the sentences. Further, a component or operation stated as 'including (or having)' does not exclude existence or addition of one or more other components or operations. Hereafter, technical features of the present disclosure are described in detail with reference to the accompanying drawings.

FIG. 1 is a perspective view showing a case having a car safety warning sign integrated therein according to an embodiment of the present disclosure, FIG. 2 is a perspective view sowing a deployed state of the safety warning sign, FIG. 3 is a front view of FIG. 2, FIG. 4 is a rear view of FIG. 2, FIG. 5 is a left side view of FIG. 2, and FIG. 6 is a right side view of FIG. 2.

Referring to FIGS. 1 to 6, a case 10 having a car safety warning sign integrated therein according to an embodiment of the present disclosure includes a safety warning sign 12 and a body 11 that are integrated, so it can be immediately attached and installed in a vehicle without an unnecessary preparation action of taking out the safety warning sign 12 from the case 10 or assembling the safety warning sign in an emergency. Accordingly, when an accident occurs, a driver embarrassed due to an accident can easily and quickly install the safety warning sign, so a sufficient escape time can be secured.

FIGS. 7 and 8 are views showing the body according to the present disclosure. FIG. 7 is a front view showing from the front an open state by a housing and a cover of the body with the safety warning sign separated from the body, and FIG. 8 is a side perspective view of the body shown in FIG. 7 when seen from a side.

Referring to FIGS. 7 and 8, the body 11 according to the present disclosure includes a housing 111 in which the safety warning sign 12 is accommodated, and a cover 12 that opens/closes the opening of the housing 111. The housing 111 includes a first accommodation groove section 111a at which a semicircular first accommodation groove g1, in which the safety warning sign 12 rolled in a roll type is accommodated, is formed, and a first panel section 111b that is integrally formed over the first accommodation groove section 111a and that has a first magnetic body m1 embedded in the front surface thereof. Side covers c are installed at both sides of the first accommodation groove section 111a, respectively, to prevent the safety warning sign 12 accommodated in the accommodation groove 111a from sliding out from the both sides. The cover 112 includes a second accommodation groove section 112a at which a semicircular second accommodation groove g2 is formed symmetrically to the first accommodation groove 111a, and a second panel section 112b in which a second magnetic body m2 is embedded to be attached to the first magnetic body m1 embedded in the first panel section 111b of the housing 111. The second panel section 112b may protrude toward a side such that the center of gravity is biased in a separation direction from the first panel section 111b when it is attached to the first panel section 111b so that it can be easily opened by its own weight when a user separates it from the first panel section 111b using a finger. Further, a non-slip part 112c may be further installed at the center of the second panel section 112b of the cover 112 to provide an excellent sense of touch while preventing slip of fingers when a user pulls the second panel section 112b using fingers to open the housing 111. The first and second magnetic bodies m1 and m2 may be only magnetic members or may be a magnetic member and a metal member, respectively. For example, as for the latter, the first magnetic body m1 may be a magnetic member and the second magnetic body m2 may be a metal member. Of course, the opposite case is also possible. The lower end of the cover 112 is rotatably coupled to the lower end of the housing 111 through a rotary member 113. The rotary member 113 may be a connection member or a connection band made of one of flexible materials including a fiber material (cloth, leather, etc.), a synthetic resin material, a rubber material, or a metallic material. Further, the rotary member 113 may be a hinge member, such a hinge. When the cover 112 is attached to the housing 111 by the first and second magnetic bodies m1 and m2 of the first and second panel sections 111b and 112b, circular accommodation space is formed by the first and second accommodation grooves g1 and g2, and the safety warning sign 12 rolled in a roll type is accommodated in the accommodation space.

Meanwhile, as in FIGS. 5 and 6, when wind blows with the safety warning sign 12 fully deployed, the safety warning sign 12 made of a relatively light material flutters in the wind, whereby there may be a problem that drivers of following vehicles cannot clearly recognize the safety warning sign 12. Accordingly, in the present disclosure, Velcro tape may be additionally disposed on the non-slip section 112c on which the safety warning sign 12 is supported in close contact in order to attach and couple the second panel section 112b, which has a relatively predetermined level of weight, to the rear surface of the safety warning sign 12 through the non-slip section 112c. Accordingly, as shown in FIGS. 5 and 6, when the second panel section 112b supports the rear surface of the safety warning sign 12 fully deployed, the Velcro tape on the non-slip section 112c is attached and coupled to the rear surface of the safety warning sign 12 and supports the safety warning sign 12 in cooperation with the second panel section 112b, thereby preventing the safety warning sign 12 from waving due to wind. That is, a winding rod 112 installed at the lower portion of the safety warning sign 12 functions as a weight, so when the safety warning sign 12 is deployed, the safety warning sign 12 can have a supporting force corresponding to the weight of the winding rod 122.

However, when wind blows, it may be limited to stably support the safety warning sign 12 using only the winding rod 122. Accordingly, in the present disclosure, the rear surface of the safety warning sign 12 is attached and fixed to the second panel section 112b, which has a bar structure and can function as a weight, through the non-slip section 112c, whereby it is possible to more stably support the safety warning sign 12.

As in FIG. 8, a fitting groove s in which the upper end of the safety warning sign 12 is fitted is longitudinally formed at a portion, which is not interfered with when the cover 112 is attached, at the upper end of the housing 111.

FIG. 9 is a front view showing a deployed state to describe the safety warning sign according to the present disclosure.

Referring to FIG. 9, the safety warning sign 12 according to the present disclosure is coupled such that the upper end is longitudinally fitted in the fitting groove s of the housing 111 in the width direction (transverse direction in FIG. 11). A rail member 121 is disposed at the upper end of the safety warning sign 12 so that the safety warning sign 12 made of a soft material is easily fitted into the fitting groove s formed at the first panel section 111b of the housing 111. The rail member 121 may be made of a fiber material, a synthetic resin material, or a metal material. Further, the winding rod 122 that is a cylindrical rod having a predetermined weight is disposed at the lower end of the safety warning sign 12 so that the safety warning sign 12 rolled in a roll type and accommodated in the first accommodation groove 111a of the housing 111 are unrolled and deployed by its own weight (gravity) when the cover 112 is opened. The safety warning sign 12 may be made of a flexible material to be rolled on the winding rod 12. For example, the safety warning sign 12 may be made of a fiber (cloth) material, a synthetic resin material, or the like.

As in FIG. 11, the safety warning sign 12 has, on the front surface, a warning mark 12a for informing drivers of following vehicles of a danger in the front area. In this case, the warning mark 12a may be printed or may be separately made of reflective cloth or a reflective tape and then attached. The warning mark 12a may be made of a reflective plate or luminous paper, which reflects incident light, to be easily recognized even at night. The warning mark 12a may be detachably attached to the safety warning sign 12. For example, the warning mark 12a may be a triangular mark formed in a triangular shape and disposed at the center of the safety warning sign 12. Further, diagonal marks may be disposed outside the triangular mark. A red color that has high visibility because it is conspicuous may be applied to the triangular mark and a yellow color may be applied to the diagonal marks.

As in FIGS. 7 and 8, a mounting member 13 for mounting the housing 11 to the trunk of a vehicle is installed at the center of the housing 111, preferably, at the first panel section 111b of the housing 111.

As in FIG. 4, the lower end of the mounting member 13 is connected and fixed to the rear surface of the first panel section 111b and a magnetic body 13a is embedded in the upper end thereof, whereby a user can more simply and quickly attach the body 11 to the trunk of a vehicle using magnetism. The mounting member 13 may be made of a flexible material. For example, the mounting member 13 may be made of any one of a fiber material (cloth, leather, etc.), a synthetic resin material, or a rubber material.

FIGS. 10 to 12 are views showing a deployment process of the safety warning sign according to the present disclosure.

As in FIG. 10, the safety warning sign 12 can be accommodated in the accommodation space of the body 11 when it is not used. In this case, the body 11 with the safety warning sign 12 accommodated therein is stowed in a trunk 11. Thereafter, as shown in FIGS. 11 and 12, in an emergency, a user opens the door of the trunk 1, takes the case 10 out of the trunk 1, and attaches and fixes the case 10 to the trunk 1 using the mounting member 13. Thereafter, the user pulls and separates the cover 12 of the body 11 downward from the housing 111 using a finger. Accordingly, the housing 111 is opened and the safety warning sign 12 is exposed. Accordingly, as in FIGS. 2 and 3, as the housing 111 is opened, the safety warning sign 12 accommodated and stored in the accommodation space is moved down and unrolled and deployed by the weight of the winding rod 122.

FIG. 13 is a view showing from a side the state in which the case having a car safety warning sign integrated therein according to an embodiment of the present disclosure is installed at a trunk. As in FIG. 13, since the safety warning sign 12 is attached and fixed to the end of the trunk 1 in use, it is positioned at a relatively high position from the ground and can be easily recognized by drivers of following vehicles, thereby preventing a secondary accident.

FIGS. 14 and 15 are views showing the state in which the case having a car safety warning sign integrated therein according to an embodiment of the present disclosure is installed. FIG. 14 is a view showing an installation state in the daytime and FIG. 15 a view showing an installation state at night. Further, FIG. 16 is a comparison view showing the state in which the case having a car safety warning sign integrated therein is not installed at a trunk at night.

As in FIGS. 14 and 15, when the case 10 having a car safety warning sign integrated therein according to an embodiment of the present disclosure is installed at the trunk, the warning mark 12a of the safety warning sign 12 brightly shines, so it can be easily visually recognized in both daytime and nighttime. However, as in FIG. 16, when the case 10 having a car safety warning sign integrated therein according to an embodiment of the present disclosure is not installed, it can be seen that the vehicle looks dark and is difficult to recognize.

FIG. 17 is a front view for describing a safety warning sign according to another example of the present disclosure.

Referring to FIG. 17, a safety warning sign 22 according to another example of the present disclosure includes a warning mark 22a, a rail member 221, and a winding rod 222. The case 10 further includes a distance mark 22b so that drivers of following vehicles can recognize the distance from the vehicle at which the safety warning sign 22 is installed. The distance mark 22b is luminously printed or is separately made of a reflective cloth or a reflective tape and then attached to be recognizable at night, similarly to the warning mark 22a. The distance mark 22b is composed of a plurality of Arabian numbers having different sizes. In this case, in the distance mark 22b, '30' means 30 m, '20' means 20 m, and '10' means 10 m. The size of the distance mark 22b is determined within a range that can be recognized in both daytime and nighttime at the corresponding distances on the basis of the average eyesight of adults. For example, '30' is formed in a size that can be recognized by people at 30 m, '20' is formed in a size that can be recognized by people at 20 m, and '10' is formed in a size that can be recognized by people at 10 m. Accordingly, drivers of following vehicles recognize a dangerous situation through the warning mark 22a, recognize the distances from themselves to the current place with the dangerous situation through the distance mark 22b, and appropriately cope with the situation, depending on the distances, whereby it is possible to remarkably reduce a secondary accident ratio.

Further, the safety warning sign 22 according to another example of the present disclosure may include a connecting ring 223 connected to the center of the winding rod 22 to fix the winding rod 222 such that the safety warning sign 22 does not flutter in the wind, an elastic string 224 connected to the connecting ring 224, and a magnetic body 225 connected to an end of the elastic string 224 and attached and fixed to the car body of a vehicle by magnetism.

As in FIG. 13, the winding rod 22 of the safety warning sign 22 is float without being fixed in the air with the case 10 attached and fixed to the trunk 1. Accordingly, when wind blows or a large vehicle passes by at a high speed in the next lane, the safety warning sign 22 flutters and drivers of following vehicles may not recognize the safety warning sign 22. Accordingly, in another example of the present disclosure, the magnetic body 225 is connected to the winding rod 222 by the connecting ring 223 and the elastic string 224 and the winding rod 222 is stably fixed by attaching and fixing the magnetic body 222 to a car body using magnetism to prevent the safety warning sign 22 from fluttering in the wind, whereby it is possible to minimize or prevent fluttering of the safety warning sign 22 even if wind blows. In this case, the connecting ring 223 is installed to be detachable from the winding rod 222 and the elastic string 224 may be a rubber string or rubber band that extends when a predetermined force is applied. The winding rod 222 is made of a transparent material and has an LED module and a battery therein such that an LED lamp is turned on and off at night, whereby it is possible to further improve visibility.

As described above, according to the case 10 having a car safety warning sign integrated therein according to an embodiment of the present disclosure, since the body 11 and the safety warning sign 22 are integrated, the safety warning sign 12 is easily stored and carried when it is not used, and an embarrassed driver can easily and quickly install the safety warning sign by immediately mounting the safety warning sign in a vehicle without an unnecessary preparation actions such as taking the safety warning sign 12 out of the body 11 or assembling the safety warning sign 12 in an emergency, whereby it is possible to secure a sufficient escape time.

Further, the case 10 having a car safety warning sign integrated therein according to an embodiment of the present disclosure can be quickly and simply mounted at the end of the trunk 1 of a vehicle through magnetism using the mounting member 13 in an accident. That is, since magnetism is used, the case can be easily detached/attached and a driver can freely install the case at positions that drivers of following vehicles can easily recognize regardless of a road situation (a curve, a slope, etc.) or the structure of the vehicle (the height of the car body, the structure of the trunk, or the like), whereby it is possible to improve the possibility of recognition by drivers of following vehicles and considerably improve a secondary accident prevention ratio. Further, the case 10 having a car safety warning sign integrated therein according to an embodiment of the present disclosure is mounted in a trunk 1 of a vehicle through the mounting member 13, and then the housing 111 is opened in a one touch type by separating the cover 112 of the body 11 from the housing 111, and simultaneously, the safety warning sign 12 accommodated therein is automatically deployed, so it is possible to quickly install the case and to secure a sufficient time so that a driver can escape from the site of a car accident.

While the technical spirit of the present invention was described in detail through embodiments, it should be noted that the embodiments is for describing, not limiting, the present disclosure. It would be understood that various embodiments may be achieved by those skilled in the art by combining the embodiments of the present disclosure within the spirit of the present disclosure.

The invention claimed is:

1. A case having a car safety warning sign integrally stored therein, the case comprising:
    a body including a housing having a fitting groove longitudinally formed and a cover opening and closing the housing;
    a safety warning sign having an upper end fitted in a fitting groove formed at the housing to be integrally coupled, rolled in a roll type and accommodated in the housing when not used, and being moved down, unrolled, and deployed by its own weight simultaneously as the housing is opened in an emergency situation;
    a mounting member connected to the body, having a magnetic body embedded therein, and attaching and fixing the body to a trunk of a vehicle; and
    a rotary member rotatably coupling the cover to a lower end of the housing,
    wherein the housing includes a first accommodation groove section at which a semicircular first accommodation groove, in which the rolled safety warning sign is accommodated, is formed, and a first panel section to which the mounting member is connected, that is integrally formed over the first accommodation groove section, and that has a first magnetic body embedded in a front surface thereof, and the cover includes a second accommodation groove section at which a semicircular second accommodation groove is formed symmetrically to the first accommodation groove of the body, and a second panel section in which a second magnetic body is embedded to be attached to the first magnetic body embedded in the first panel section of the body by magnetism.

2. The case of claim 1, wherein when the first and second panel sections are attached to each other through the first and second magnetic bodies, a circular accommodation space in which the safety warning sign rolled in a roll type is accommodated is formed by the first and second accommodation grooves.

3. The case of claim 2, further comprising a non-slip section installed at the center of the second panel section and preventing slip of fingers when a user pulls the second panel section using fingers to open the housing.

4. The case of claim 2, wherein the safety warning sign has a safety warning mark at the center thereof to be recognizable, a rail member disposed at the upper end thereof to be fitted in a fitting groove of the body, and a winding rod, which is formed in a cylindrical rod shape such that the safety warning sign rolled in a roll type and accommodated in the first accommodation groove of the housing is unrolled and deployed by its own weight when the cover is opened, at the lower end thereof.

5. The case of claim 4, wherein the safety warning sign further has a distance mark shown with '30', '20', and '10' so that drivers of following vehicles can recognize distances from the vehicles, wherein the '30' is formed in a size that can be recognized by people at 30 m, the '20' is formed in a size that can be recognized by people at 20 m, and the '10' is formed in a size that can be recognized by people at 10 m, and the distance mark is formed by any one of luminous printing, reflective cloth, or a reflective tape.

6. The case of claim 4, wherein the safety warning sign further includes a connecting ring connected to the center of the winding rod to fix the winding rod such that the safety warning sign does not flutter in the wind in an unrolled state, an elastic string connected to the connecting ring, and a magnetic body connected to an end of the elastic string and attached and fixed to a car body of a vehicle by magnetism.

\* \* \* \* \*